(12) United States Patent
Nevdahs et al.

(10) Patent No.: US 11,295,141 B1
(45) Date of Patent: Apr. 5, 2022

(54) SECURITY CAMERA DRONE STATION DETECTION

(71) Applicant: Alarm.com Incorporated, Tysons, VA (US)

(72) Inventors: Ilja Nevdahs, Carnikava (LV); Agris Kipurs, Jelgava (LV)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/820,586

(22) Filed: Mar. 16, 2020

Related U.S. Application Data

(60) Provisional application No. 62/819,131, filed on Mar. 15, 2019.

(51) Int. Cl.
| | |
|---|---|
| *G06K 9/00* | (2006.01) |
| *H04N 7/18* | (2006.01) |
| *B64C 39/02* | (2006.01) |
| *B64D 47/08* | (2006.01) |
| *G01B 11/14* | (2006.01) |

(52) U.S. Cl.
CPC ........ *G06K 9/00771* (2013.01); *B64C 39/024* (2013.01); *B64D 47/08* (2013.01); *G01B 11/14* (2013.01); *G06K 9/0063* (2013.01); *H04N 7/185* (2013.01); *B64C 2201/027* (2013.01); *B64C 2201/127* (2013.01)

(58) Field of Classification Search
USPC ....................................................... 348/144
See application file for complete search history.

(56) References Cited

U.S. PATENT DOCUMENTS

| | | | | |
|---|---|---|---|---|
| 2013/0201326 | A1* | 8/2013 | Tsujii ..................... | G01C 11/02 348/135 |
| 2016/0018822 | A1* | 1/2016 | Nevdahs .............. | G05D 1/0094 701/26 |
| 2016/0137311 | A1* | 5/2016 | Peverill .................. | G05D 1/101 244/110 C |
| 2017/0337707 | A1* | 11/2017 | Chuang .................... | G06T 7/80 |

\* cited by examiner

*Primary Examiner* — Mikhail Itskovich
(74) *Attorney, Agent, or Firm* — Fish & Richardson P.C.

(57) ABSTRACT

Methods, systems, and apparatus, including computer programs encoded on computer-storage media, for drone base station detection. In some implementations, a drone including a camera that is configured to generate image data and one or more processors and one or more storage devices storing instructions that are operable. The instructions include receiving the image data from the camera, identifying at least four objects in the image data, determining a first distance between a first object and a second object, determining a second distance between a third object and a fourth object, determining a third distance between the second object and the third object, and based on the first distance, the second distance, and the third distance, determining a location of the drone.

20 Claims, 5 Drawing Sheets

SECURITY CAMERA DRONE STATION DETECTION

CROSS-REFERENCE TO RELATED APPLICATION

This application claims the benefit of U.S. Application No. 62/819,131, filed Mar. 15, 2019, which is incorporated by reference.

BACKGROUND

Many properties are equipped with monitoring systems that include sensors and connected system components.

SUMMARY

Techniques are described for security camera drone station detection. A drone may have sensors onboard (e.g., mono, stereo, or time-of-flight (TOF) cameras, IR detectors, rangefinders, radars, etc.). The drone may use one or more of these sensors to localize itself in the environment. The drone may need servicing (e.g., change or charge battery, repairs, etc.) that may be performed at a base station. Identification markers on a base station may be used by the drone to detect the base station and to localize the drone.

According to an innovative aspect of the subject matter described in this specification, the drone uses an onboard image capture device to capture image data. The image data, is used to identify at least four objects in the image data. Based on distances between a first object and a second object, a second object and a third object, and a third object and a fourth object, a location of the drone is determined by either the drone itself or a system communicably connected to the drone.

These and other implementations can each optionally include one or more of the following features. For example, image data may contain four objects along a straight line. For another example, two objects may be located on one end of a straight line and two other object may be located on another end of the straight line.

In some implementations, calculations involving one or more of the objects in the image data may be used for locating the drone or the base station. For example, an average of a first distance and a second distance may be used to determine the location of the drone. For another example, a ratio of the average of the first distance and the second distance and a third distance between the second object and third object is used to determine the location of the drone.

In some implementations, a ratio determined from distances between objects captured from image data may be compared with predetermined ratios corresponding to known locations in order to determine the location of the drone. For example, a first ratio of the average of the first distance and the second distance and the third distance between the second object and third object may be compared with a known ratio that is predetermined. In some cases, the known ratio may be similar or equal to the first ratio. The location of the drone may be determined based on a comparison or a similarity between the first ratio and the known ratio.

In some implementations, data from one or more components of a monitoring system may be used to determine a location of the drone. For example, a threshold may be used to determine if a first ratio is similar to a known ratio as discussed above. The threshold may be based on a state of the monitoring system associated with the drone.

In some implementations, the location of the drone is known after determining or obtaining the location of one or more of the objects within the image data. For example, a drone can receive data indicating that four objects are located at a known location of a property. Based on receiving the data, the drone, or a component communicably connected to the drone, can determine a location of the drone by determining that the drone is located at the known location. In some cases, a base station or base station is located at the known location.

In some implementations, a pose of the drone is determined. For example, based on a first distance, a second distance, and a third distance corresponding to distances between one or more objects detected in the image data, the drone, or a component communicably connected to the drone, can determine a pose of the drone.

In some implementations, the four objects are visual markers. For example, the four objects can be visible light beacons, infrared light beacons, reflective markers, etc.

In some implementations, determining a location of the drone includes detecting a base station. For example, responsive to detecting a base station, a drone or a component communicably connected to the drone, can determine the location of the drone relative to a location of the base station.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A drone may be able to determine its location in a given local coordinate frame using data related to a base station. The base station, in some implementations, may be slim in profile (e.g., minimal vertical dimensions) in order to improve functionality or to reduce impact on any surrounding aesthetic. The base station may be designed so as to be detectable by the drone without requiring the drone to carry additional sensors or components. The base station may include passive features to increase cost effectiveness of systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
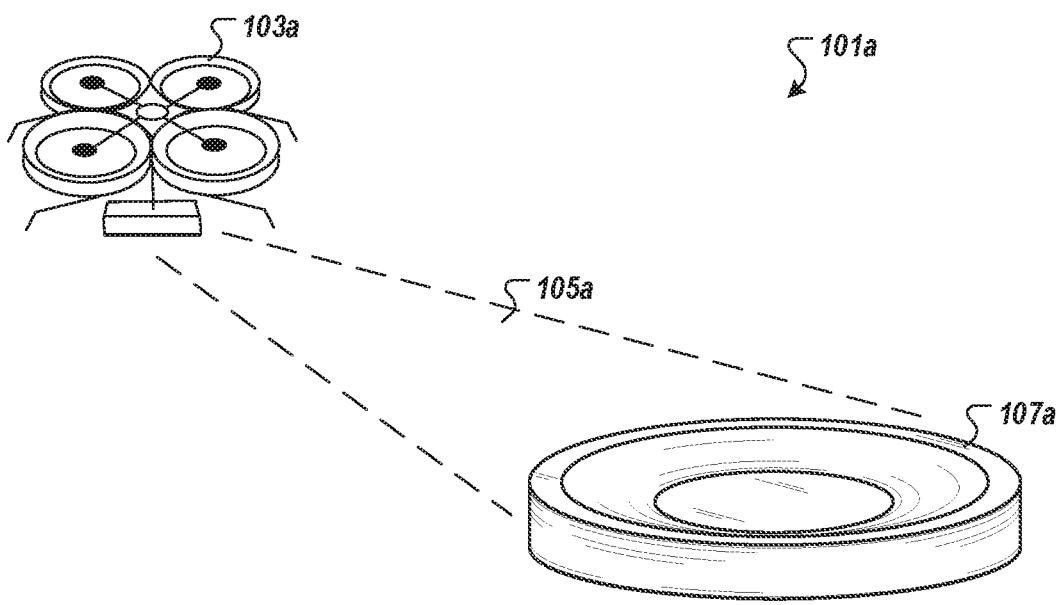
FIG. 1 is a diagram showing examples for drone base station detection.
Figure 1:
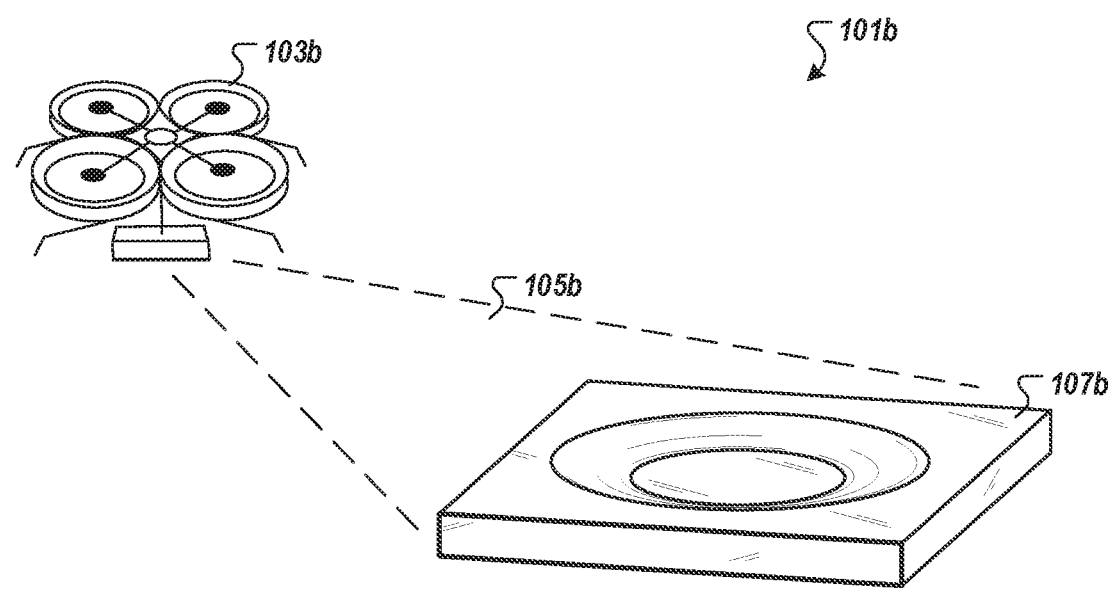

FIG. 1 is a diagram showing examples, a system 101*a* and a system 101*b*, for drone base station detection. The system 101a includes a drone 103a, a detection region 105a, and a cylindrical base station 107a. The system 101b includes a drone 103b, a detection region 105b, and an orthogonal base station 107b.

Depending on implementation, the cylindrical base station 107a or the orthogonal base station 107b can be used within a given monitoring system. For example, both the cylindrical base station 107a and the orthogonal base station 107b can be used as a base station.

In the example of FIG. 1, both the cylindrical base station 107a and the orthogonal base station 107b have slim profiles and can be placed within a property. Both the cylindrical base station 107a and the orthogonal base station 107b have indentations to allow the drone 103a and the drone 103b to land, respectively.

In some implementations, a base station is made out of a specific material. For example, the cylindrical base station 107a or the orthogonal base station 107b can be made out of metal, plastic, wood, glass, or other commonly used material. In some cases, combinations of materials can be used.

In both the system 101a and the system 101b, a drone detects a base station. A camera onboard both the drone 103a and the drone 103b detect elements related to the cylindrical base station 107a and the orthogonal base station 107b, respectively. The details of the detection are discussed below, particularly in reference to FIG. 2 and FIG. 3.

In some implementations, visual inertial odometry (VIO) is used to detect a base station. For example, a drone's direction of travel and position can be measured by fusing vision sensor data with inertial measurement unit (IMU) sensor data. In some cases, the IMU is an electronic device that measures and reports an object's specific force, angular rate, and, in depending on implementation, the magnetic field surrounding the object, using a combination of accelerometers and gyroscopes or magnetometers.

In some implementations, elements related to a base station are used to detect a base station. For example, the drone 103a can use sensors (e.g., onboard video camera, VIO camera, infrared (IR) camera, TOF camera). In some cases, a TOF camera can be used for environment mapping and obstacle detection.

In some implementations, a base station may include active or passive features. For example, a base station may include active elements such as visible light beacons or IR light beacons. In some cases, the visible light beacons can be used to aid in detections with video or VIO cameras. In other cases, the IR light beacons can be used to aid in detections with IR or TOF cameras. For another example, a base station may include passive features such as visual tags or markers. In some cases, the passive features on the base station may be more cost effective compared to active features.

In some implementations, a base station or a drone within a system may be implemented with technology to improve detection. For example, retro-reflective technology can be used on a base station to help promote higher amounts of visible light or IR light emitted by a drone's onboard emitters reflected back to the drone's sensors.

In some implementations, features on a base station may be arranged in a unique pattern. For example, the drone 103a may detect features on the cylindrical base station 107a in a unique pattern corresponding to a stored unique pattern. Based on a comparison between the unique pattern detected on the cylindrical base station 107a and the stored unique pattern, the drone 103a can determine the identity of the cylindrical base station 107a and possible other data associated with the determination.

In some implementations, base stations within one or more systems, or base stations within one system, may appear different but may share similar qualities. For example, the cylindrical base station 107a has a cylindrical base while the orthogonal base station 107b has an orthogonal base. The cylindrical base station 107a and the orthogonal base station 107b appear different but share the quality of a slim profile in the vertical direction and the ability to be detected by the drone 103a and 103b, respectively.

In some implementations, other forms may be used for a base station. For example. a base station with a triangular base can be used with another system or one of the existing systems (e.g. the system 101a or the system 101b). In some cases, the base station with a triangular base may have a slim profile, an indentation to receive a drone, and be able to be detected by the drone.

Figure 2:
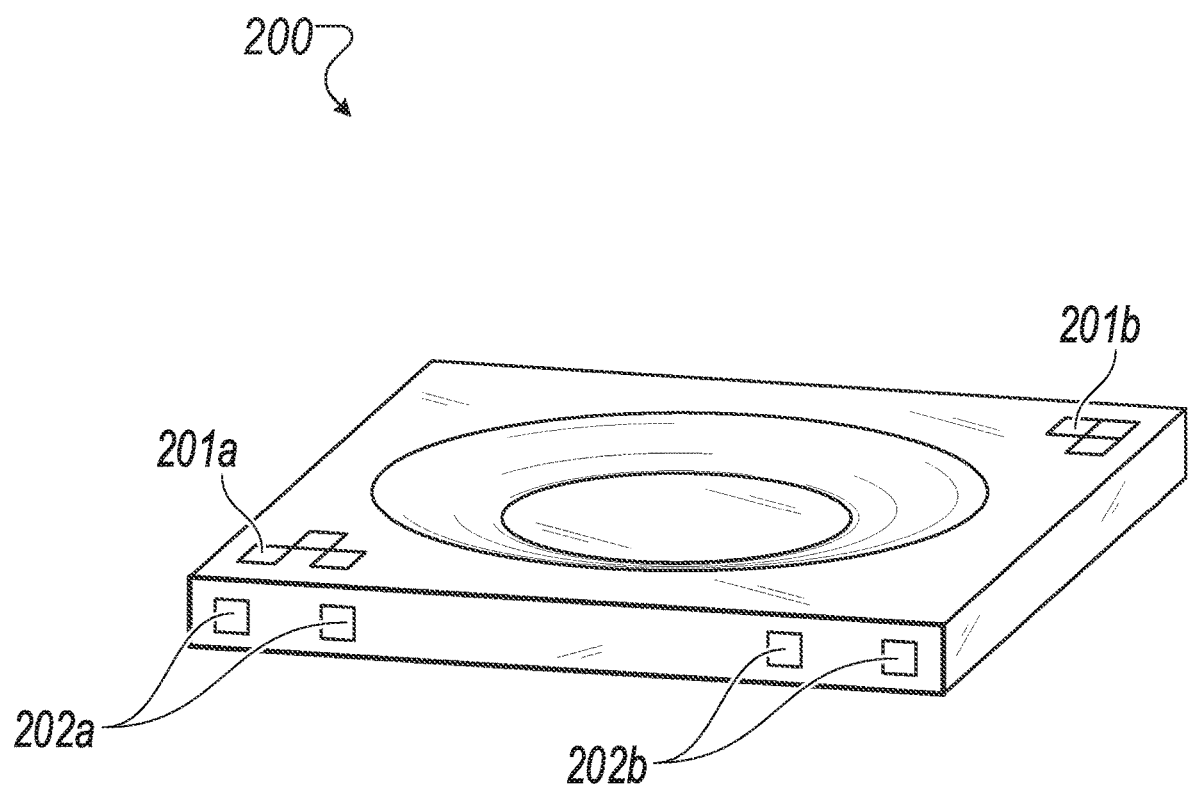
FIG. 2 is a diagram showing an example of a base station with visual markers for drone base station detection.

FIG. 2 is a diagram showing an example of a base station 200 with visual markers for drone base station detection. The base station 200 is modeled on the orthogonal base station 107b of FIG. 1 and includes features or visual markers arranged on two surfaces of the base station 200. On a top surface, markers 201a and 201b are arranged. On a side or vertical surface, markers 202a and 202b are arranged.

Markers 201a and 201b are arranged on the top surface of the base station 200 in a unique pattern. The unique pattern of the markers 201a and 201b enable a nearby drone to detect the unique pattern of the markers 201a and 201b and to identify the base station 200 based on the unique pattern.

In some implementations, feature arrangement may include one or more markings. For example, the markers 201a and 201b may include encoded three-dimensional information about the surface of the base station for unique identification and precise localization.

In some implementations, features on the top surface of the base station 200 may encounter visual distortion or other disturbances. For example, indoor lighting can shine on the top surface of the base station 200 and obscure the arrangement from the detection of a given drone. The side or vertical surface markers 202a and 202b can be used in these situations to allow one or more drones to detect the base station and other data.

In some implementations, components on a given drone are used to deal with non-ideal detecting situations. For example, in brighter conditions with hard sunlight or hard shadows casted onto the base station surface or objects around the base station or other situations that degrade detections of the base station by cameras of the drone, the drone may have onboard infrared (IR) emitters, directionally aligned IR sensors, or TOF operations. The onboard IR emitters, directionally aligned IR sensors, or TOF operations can be used to detect the base station or features related to the base station.

The markers 202a and 202b on the side of the base station 200 may be used to identify the base station 200. Data related to the distance between the components of the markers 202a and the markers 202b (X) and the distance between the markers 202a and the markers 202b (Y) may be used to uniquely identify the base station 200.

Depending on implementation, a unique identity of a given base station can correspond to specific information. For example, an identity of a base station can correspond with a precise location of the base station with a property, a charging capacity of the base station or other service offered by the base station.

According to the example of FIG. 2, the base station 200 is configured to be detected by a given drone. The given drone can detect areas within the image such as the markers

202*a* and 202*b*. The given drone can search for N number of markers that are similar in size and aligned on a given axis. The given drone can further perform steps related to determining the distance between components of the markers 202*a* and the markers 202*b* (P1 and P2), calculating the average distance between the components, X1=((P1+P2)/2), determine distance between inner markers of the markers 202*a* and the markers 202*b*, Y1, and compare proportion X1/Y1 with predetermined proportions of one or more base stations. In this example, a predetermined proportion X/Y corresponds to a first base station. If the proportion determined based on the detection of the base station 200 corresponds to the given predetermined proportion of X/Y, or is within a threshold (e.g., 5%, 10%, 25%, etc.) of the given predetermine proportion of X/Y, then the base station is detected as the first base station.

In some implementations, further data may be obtained after a detection of a base station. For example, after the base station features are detected and the base station is identified, estimation of the base station pose, a given drone's pose, coordinates of the base station, coordinates of the given drone, or other data may be calculated or determined.

In some implementations, the number of pixels within image data captured by a given drone can be used to determine a given distance. For example, a drone can capture an image of the base station 200. The drone, or component communicably connected to the drone, can calculate a number of pixels between the markers 202*a* and the markers 202*b* to determine a distance between the markers 202*a* and the markers 202*b*.

In some implementations, other algorithms are used. For example, instead of computing a ratio, an algorithm can simply detect a distance between two objects and compare the two distances to other known two distances corresponding to known base stations to discover the identity of a given base station.

In some implementations, other objects or markers are used. For example, instead of the four objects being used to detect distances and ratios, other objects or markers can be used. The other markers can be on the same surface or a different surface. For example, a group of ten objects on the top surface of a base station can be detected by a given drone. The drone can use the relative position and corresponding distances between the markers to identify the base station. The identity of the base station can be used to determine the location or other data related to the given drone.

In some implementations, other sensors are used by a given drone. For example, the given drone may use a TOF camera to measure distance to one or more base station features arranged on the front surface of the base station 200 or another surface of the base station 200.

In some implementations, markers can be changed by a base station. For example, lights or light emitting diodes (LEDs) can be used as one or more markers. The base station can change the colors of the lights or LEDs. The base station can change the pattern of markers. For example, in the case of light markers, lights can be switched on or off or physically moved to create alternate patterns. In some cases, lighting conditions can impact change of one or more markers on the base station. For example, lights used for markers can increase brightness in situations where ambient light from room lighting or outdoor light sources shine on the base station.

In some implementations, markers can change to convey information between a base station and drone. For example, a base station can convey a current status of the base station. Example information to be conveyed can include information that the base station is partially covered and therefore a drone should not land, information that the base station is open for landing, information that the base station is currently operating on battery power and charging speeds may be affected, information that wireless charging is not available but contact charging is available, information that a drone should land on the base station or how the drone should land on the base station, etc.

In some implementations, markers can slide, rotate, or otherwise move to assist a drone in identifying one or more markers properly. For example, markers on a side of a base station facing away from an incoming drone can be moved to another side of the base station facing towards the incoming drone to allow the incoming drone to detect the markers. Based on detecting the markers after the markers have been moved by the base station, the drone can land on the base station.

In some implementations, communications between a drone and a base station about marker location or orientation can assist the drone in landing on the base station. For example, a base station can use markers on the base station to inform a drone that one side of the base station is covered and should be avoided. The markers can convey a specific orientation in which to land. For example, the charging mechanism of the base station may require specific alignment. The markers can convey the particular alignment of the base station to the drone to enable correct alignment.

In some implementations, movement or change of markers can be informed by one or more other components within a system. For example, a drone approaching a base station can detect an obstruction over a portion of the markers on the base station. The drone can send a signal to the base station to modify or move the markers to enable the drone to detect the markers. For another example, a camera within the room can capture visual data and determine based on the visual data that a portion of the markers on the base station are covered. The camera can communicate directly with the base station or through an intermediary such as a control unit to inform the base station that the markers should be modified or moved to enable a drone to detect the markers. Similarly, a drone may detect markers that are not known within a system. In some cases, this can be a result of markers malfunctioning on the base station. The drone can communicate with the base station and prompt the base station to modify or move the markers.

In some implementations, one or more markers used by a base station can deteriorate. For example, a drone, or another component in a system such as a security camera, can detect a marker becoming worn (e.g., losing distinguishing characteristics, becoming dirty, scratched off or damaged, etc.). Depending on implementations, alerts or remedies can be pursued. For example, alerts to a user that a given marker has become worn or otherwise defective can be issued by the base station or another component within a system. The user can then replace, repair, or otherwise fix the issue. In some cases, automatic changes can be performed to fix a given marker issue. For example, if a light used for a marker on a base station becomes defective, the base station can switch or modify the markers so as not to use the defective light.

In some implementations, a marker on a base station can become obscured. For example, a towel may fall on top of a portion of the markers or the markers may be otherwise obscured. In this case, a user or drone can be alerted by the base station or another component of a system. In some cases, a drone can detect obscured markers and generate alerts. Base stations or drones can coordinate on the marker suitability of all base stations in a property and use the marker status to inform which base station to use for landing. Depending on implementation, capabilities of a given drone can be factored into the analysis. For example, a more sophisticated drone may be better equipped to land on a base station without one or more markers. In this example, the more sophisticated drone can be sent to land on a base station with an obscured or defective marker while a less sophisticated drone can be sent to land on a base station with a non-obscured and non-defective marker. Based on the optimization of one or more parameters, one or more drones can be paired with one or more base stations. In some cases, a more expensive drone can be prioritized. For example, a more expensive drone can be sent to a base station with a non-obscured and non-defective marker while a less expensive drone can be sent to a base station with an obscured or defective marker.

In some implementations, a drone imaging one or more markers on a base station can project a light pattern. For example, in detecting a set of markers, a drone can project specific light. The interaction of the projected light and the set of markers can result in improved detection compared to simply imaging the set of markers.

In some implementations, a base station is equipped with a camera and can aid in drone interactions. For example, a base station is equipped with a camera and detects a drone approaching. The drone is trying to land on the base station. The base station, based on image data captured from the camera, can provide information to the drone to help the drone find one or more markers or pattern and complete a landing procedure.

Figure 3:
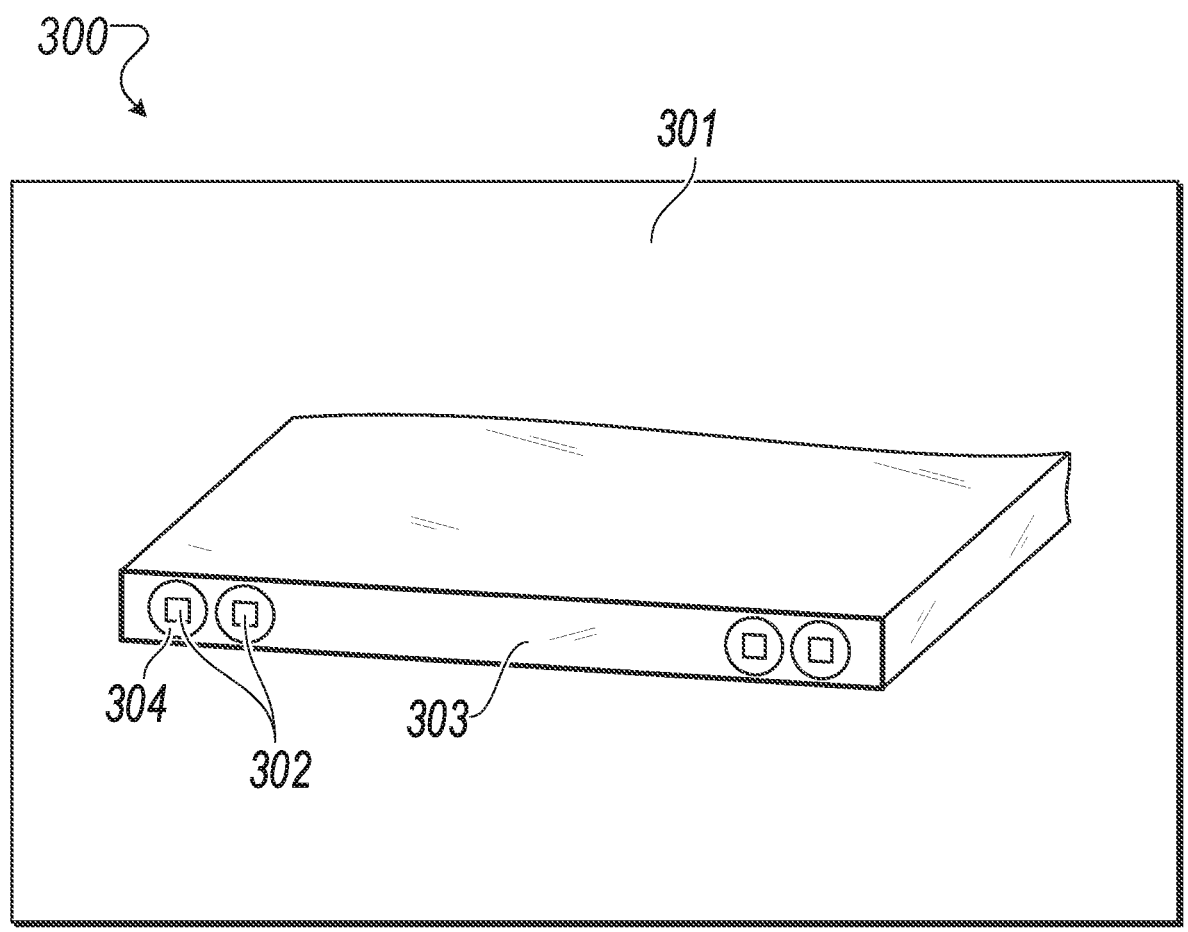
FIG. 3 is a diagram showing an example of an image of a base station viewed from a drone for drone base station detection.

FIG. 3 is a diagram showing an example of an image 300 of a base station viewed from a drone for drone base station detection. The image 300 is composed of different types of pixels. The image 300 is detected using a TOF sensor.

The image 300 includes background pixels 301 that make up the outer portions of the image. The background pixels 301 show objects and elements or lack thereof in the image 300 other than the base station and features related to the base station. In effect, the background pixels 301 can throw the base station and features related to the base station into relief. In some implementations, the background pixels 301 do not include distance information.

The image 300 includes bright pixels 302 corresponding to features on the base station. Bright pixels 302 may be pixels that correspond to a camera receiving a high amount of light. For example, the bright pixels 302 may correspond to pixels for which high amounts of emitted IR light were reflected back from the base station. In some implementations, reflection of IR light may be used to determine distance data while in other implementations, no distance data is included.

The image 300 includes base station pixels 303 corresponding to distance information about surface or shape of the base station. The base station pixels 303 make up the image of the base station as shown in FIG. 3.

The image 300 includes adjacent pixels 304 corresponding to areas around the bright pixels 302 that illustrate the features or markers on the base station. In some implementations, the adjacent pixels 304 are used to measure features or markers of the base station. For example, an average of the adjacent pixels 304 can be used to estimate the distance to the base station features.

Items visually similar to the adjacent pixels 304 labeled in FIG. 3 should be considered members of the group labeled the adjacent pixels 304. Similarly, items visually similar to the bright pixels 302 labeled in FIG. 3 should be considered members of the group labeled the bright pixels 302.

In some implementations, pose estimation is performed based on a number of intermediary calculations based on specific data. For example, the specific data can be knowledge about one or more base station features or base station feature arrangements, relative dimensions on the base station surface, base station feature coordinates, pixel distances between features or markers measured in TOF camera frame, distance from drone to detected base station feature as measured by TOF camera or calculated from pixels surrounding the base station feature, or knowledge about TOF camera pose and configuration inside the drone.

Figure 4:
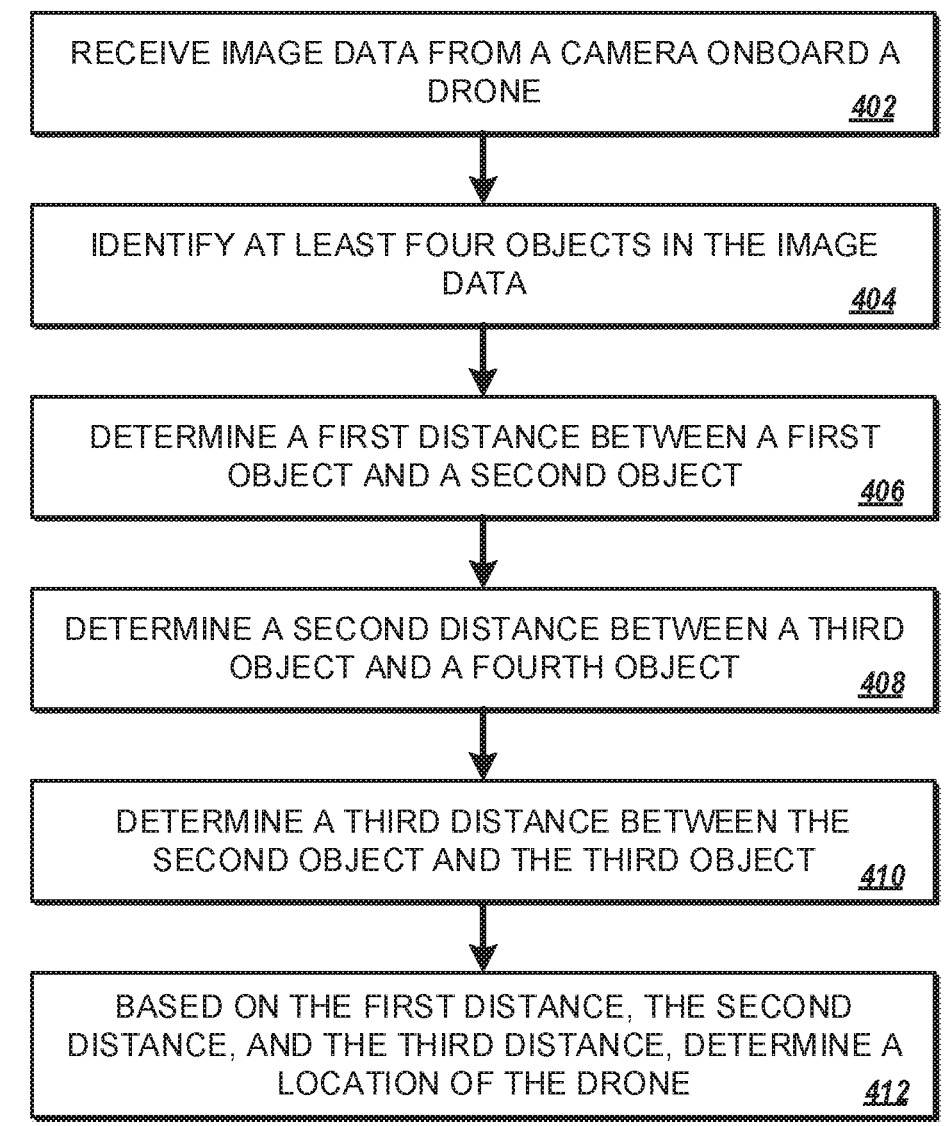
FIG. 4 is a flow diagram illustrating an example of a process for drone base station detection.

FIG. 4 is a flow diagram illustrating an example of a process for drone base station detection. The process 400 may be performed by one or more electronic systems, for example, the system 101b of FIG. 1.

The process 400 includes receiving image data from a camera onboard a drone (402). For example, the drone 103b detects the orthogonal base station 107b. One or more cameras onboard the drone 103b generate image data corresponding to the detection of the cylindrical base station 107b.

The process 400 includes identifying at least four objects in the image data (404). For example, the drone 103b identifies four objects on the orthogonal base station 107b. The markers 202a and 202b of FIG. 2 and the pixels 302 in FIG. 3 show in exemplary detail four objects.

In some implementations, the four objects in the image data are located along a straight line. For example, the bright pixels 302 may all be along a straight line that is parallel to a bottom edge of a front of the base station.

In some implementations, the first object and the second object are located on a first end of a straight line and the third object and the fourth object are located on a second, different end of the straight line. For example, the bright pixels 302 may be separated into groups as shown in FIG. 2 where the pixels 202a can include the first object and the second object and the pixels 202b can include the third object and the fourth object.

In some implementations, the four objects include visual markers. For example, the four objects can be visible light beacons, infrared light beacons, reflective markers, or other distinguishable visual markers depending on implementation.

The process 400 includes determining a first distance between a first object and a second object (406). For example, the drone 103b can detect the orthogonal base station 107b and corresponding markers such as the markers 202a shown in FIG. 2.

The process 400 includes determining a second distance between a third object and a fourth object (408). For example, the drone 103b can detect the orthogonal base station 107b and corresponding markers such as the markers 202b shown in FIG. 2.

The process 400 includes determining a third distance between the second object and the third object (410). For example, the drone 103b can detect the orthogonal base station 107b and corresponding markers such as the inner marker of the markers 202a and the inner marker of the markers 202b shown in FIG. 2.

The process 400 includes, based on the first distance, the second distance, and the third distance, determining a location of the drone (412). For example, the drone 103b, or another component of the system 101b communicably connected to the drone 103b, can compare the data related to the base station 107b that was detected by the drone 103b. The data can be compared to predetermined values. In some cases, the predetermined values correspond to locations of one or more base stations. By matching the data to the predetermined values, the base station can be identified and a location for the drone determined.

In some implementations, an average of the first distance and the second distance can be used to determine the location of the drone. For example, the first distance between the first object and the second object, such as the pixels 202a of FIG. 2, can be determined by object detection in the image data. The object detection can detect both the first and the second object in the image data and based on the location of the first object and the second object, the first distance can be determined. Similar processes can be used to determine the second distance. In some cases, numbers of pixels can be used to determine relative distance and absolute distance based on the image data. The average of the first distance and the second distance can be used in further processes or can be compared to stored values in order to determine the location of the drone by the drone itself or a component communicably connected to the drone such as a base station.

In some implementations, a ratio of the average of the first distance and the second distance and the third distance between the second object and the third object can be used to determine the location of the drone. For example, in reference to FIG. 2, a first average can be calculated from the distance between the pixels 202a and the distance between the pixels 202b. A ratio can be calculated from the first average and the distance between the inner pixels of the pixels 202a and the pixels 202b, respectively. In some implementations, the ratio can be compared with known ratios of one or more base stations. For example, if the ratio matches, or is within a given threshold error of a known ratio, the corresponding base station can be identified. Based on an identification, location and other information can be obtained.

In some implementations, a threshold used to compare one or more ratios depends on a state of a monitoring system associated with a drone. For example, a threshold may increase or decrease if the state of a monitoring system switches from not armed to armed or vice versa.

In some implementations, the four objects or base station detected in the image data are located at a known location of the property. For example, the four objects can be located in the corner of a living room or correspond to location data such as specific coordinates. In some cases, the known location of the four objects can be used to determine a location of the drone by determining that the drone is located at the known location or a certain distance and direction away from the known location. Similarly, the base station can be located in the corner of a living room or correspond to location data such as specific coordinates. In some cases, the known location of the base station can be used to determine a location of the drone by determining that the drone is located at the known location or a certain distance and direction away from the known location.

In some implementations, based on one or more distances, a pose of a drone is determined either by the drone or a component communicably connected to the drone such as a base station. For example, first distance, the second distance, and the third distance can be used to determine the drone is angled at a thirty degree angle from vertical. Distance and other data can be determined from image data or other sensors captured during operation by the drone.

In some implementations, a drone detects a base station and, based on the location of the drone relative to the location of the base station, the drone, or a component communicably connected to the drone, determines the location of the drone. For example, a base station can have a known location. A drone can detect the base station and determine the identity of the base station. Based on the detection of the base station, the identity of the base station, and corresponding information related to the base station (e.g., location, operational status, etc.), the drone or a component communicably connected to the drone can determine the location of the drone.

Figure 5:
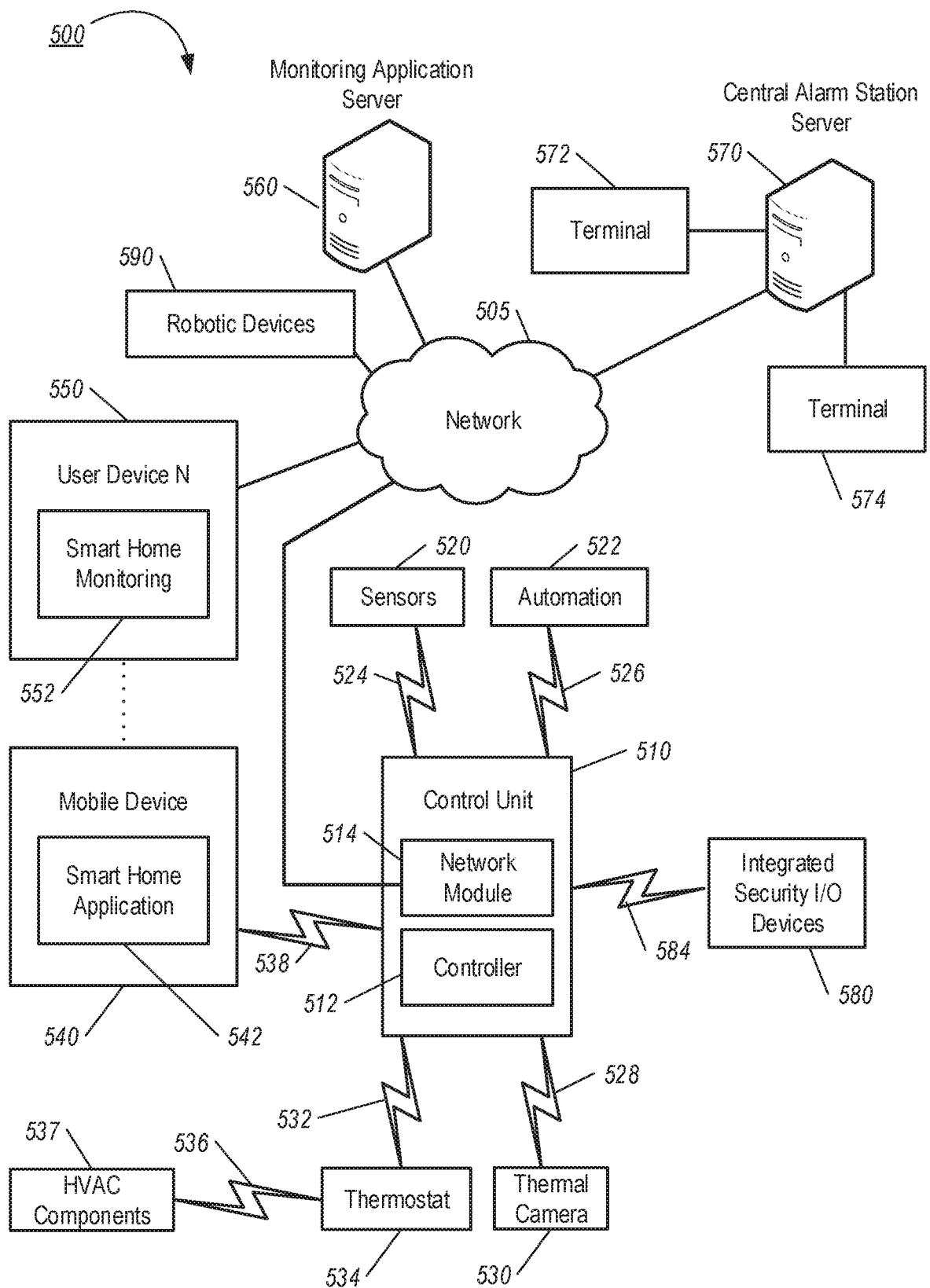
FIG. 5 is a diagram illustrating an example of a property monitoring system.

FIG. 5 is a diagram illustrating an example of a property monitoring system. The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can be an IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit, and/or another computer system of the monitoring system 500 can process and analyze.

The system 500 also includes one or more property automation controls 522 that communicate with the control unit to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 59 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A drone comprising:
   a camera that is configured to generate image data; and
   one or more processors and one or more storage devices storing instructions that are operable, when executed by the one or more processors, to cause performance of operations comprising:
      sending a signal to a base station, wherein the signal is configured to cause the base station to modify one or more objects arranged on the base station;
      receiving, from the camera, the image data depicting the base station;
      identifying at least four objects arranged on the base station in the image data, wherein the four objects comprise the one or more objects;
      determining a first distance between a first object and a second object;
      determining a second distance between a third object and a fourth object;
      determining a third distance between the second object and the third object;
      based on the first distance, the second distance, and the third distance, identifying the base station corresponding to a known location; and
      determining a location of the drone based on identifying the base station corresponding to the known location.

2. The drone of claim 1, wherein the operations comprise:
   determining an average of the first distance and the second distance,
   wherein determining the location of the drone is based on the average of the first distance and the second distance.

3. The drone of claim 2, wherein the operations comprise:
   determining a ratio of (i) the average of the first distance and the second distance and (ii) the third distance between the second object and the third object,
   wherein determining the location of the drone is based on the ratio of (i) the average of the first distance and the second distance and (ii) the third distance between the second object and the third object.

4. The drone of claim 3, wherein the operations comprise:
   comparing the ratio of (i) the average of the first distance and the second distance and (ii) the third distance between the second object and the third object to a known ratio associated with the known location,
   wherein determining the location of the drone is based on comparing the ratio of (i) the average of the first distance and the second distance and (ii) the third distance between the second object and the third object to the known ratio associated with the known location.

5. The drone of claim 4, wherein the operations comprise:
   based on comparing the ratio of (i) the average of the first distance and the second distance and (ii) the third distance between the second object and the third object to the known ratio associated with the known location, determining that the ratio of (i) the average of the first distance and the second distance and (ii) the third distance between the second object and the third object is within a threshold of the known ratio associated with the known location,
   wherein determining the location of the drone is based on determining that the ratio of (i) the average of the first distance and the second distance and (ii) the third distance between the second object and the third object is within the threshold of the known ratio associated with the known location.

6. The drone of claim 1, wherein determining the location of the drone based on identifying the base station corresponding to the known location comprises:
   receiving data indicating that the four objects are located at a second known location corresponding to the base station; and
   determining the location of the drone based on the second known location.

7. The drone of claim 1, wherein the operations comprise:
   based on the first distance, the second distance, and the third distance, determining a pose of the drone.

8. The drone of claim 1, wherein the four objects comprise:
   visible light beacons;
   infrared light beacons; or
   reflective markers.

9. A computer-implemented method comprising:
sending a signal to a base station, wherein the signal is configured to cause the base station to modify one or more objects arranged on the base station;
obtaining, by a camera of a drone, image data depicting the base station;
identifying, by the drone, at least four objects arranged on the base station in the image data, wherein the four objects comprise the one or more objects;
determining, by the drone, a first distance between a first object and a second object;
determining, by the drone, a second distance between a third object and a fourth object;
determining, by the drone, a third distance between the second object and the third object;
based on the first distance, the second distance, and the third distance, identifying the base station corresponding to a known location; and
determining a location of the drone based on identifying the base station corresponding to the known location.

10. The computer-implemented method of claim 9, further comprising:
determining an average of the first distance and the second distance,
wherein determining the location of the drone is based on the average of the first distance and the second distance.

11. The computer-implemented method of claim 10, further comprising:
determining a ratio of (i) the average of the first distance and the second distance and (ii) the third distance between the second object and the third object,
wherein determining the location of the drone is based on the ratio of (i) the average of the first distance and the second distance and (ii) the third distance between the second object and the third object.

12. The computer-implemented method of claim 11, further comprising:
comparing the ratio of (i) the average of the first distance and the second distance and (ii) the third distance between the second object and the third object to a known ratio associated with the known location,
wherein determining the location of the drone is based on comparing the ratio of (i) the average of the first distance and the second distance and (ii) the third distance between the second object and the third object to the known ratio associated with the known location.

13. The computer-implemented method of claim 9, wherein the four objects comprise:
visible light beacons;
infrared light beacons; or
reflective markers.

14. A non-transitory, computer-readable medium storing one or more instructions executable by a computer system to perform operations comprising:
sending a signal to a base station, wherein the signal is configured to cause the base station to modify one or more objects arranged on the base station;
obtaining, by a camera of a drone, image data depicting the base station;
identifying, by the drone, at least four objects arranged on the base station in the image data, wherein the four objects comprise the one or more objects;
determining, by the drone, a first distance between a first object and a second object;
determining, by the drone, a second distance between a third object and a fourth object;
determining, by the drone, a third distance between the second object and the third object;
based on the first distance, the second distance, and the third distance, identifying the base station corresponding to a known location; and
determining a location of the drone based on identifying the base station corresponding to the known location.

15. The drone of claim 1, wherein identifying the four objects arranged on the base station in the image data comprises:
identifying two objects, of the four objects, on a first surface of the base station; and
identifying two other objects, of the four objects, on a second surface of the base station.

16. The drone of claim 15, wherein the first surface is orthogonal to the second surface.

17. The drone of claim 1, wherein sending the signal to the base station is based on detecting an obstruction over the one or more objects of the four objects.

18. The drone of claim 1, wherein modifying the four objects comprises:
moving one or more of the four objects.

19. The drone of claim 1, wherein each of the four objects of the base station include encoded information indicating information of the surface of the base station.

20. The drone of claim 1, wherein the base station is configured to charge the drone.

* * * * *